R. LA FRANCE.
METHOD OF PRODUCING GLASS ARTICLES.
APPLICATION FILED APR. 22, 1912.

1,231,751.

Patented July 3, 1917.
2 SHEETS—SHEET 1.

Witnesses

Inventor
Richard La France,
By Whittemore Hulbert & Whittemore
Attys

R. LA FRANCE.
METHOD OF PRODUCING GLASS ARTICLES.
APPLICATION FILED APR. 22, 1912.
1,231,751.
Patented July 3, 1917.
2 SHEETS—SHEET 2.
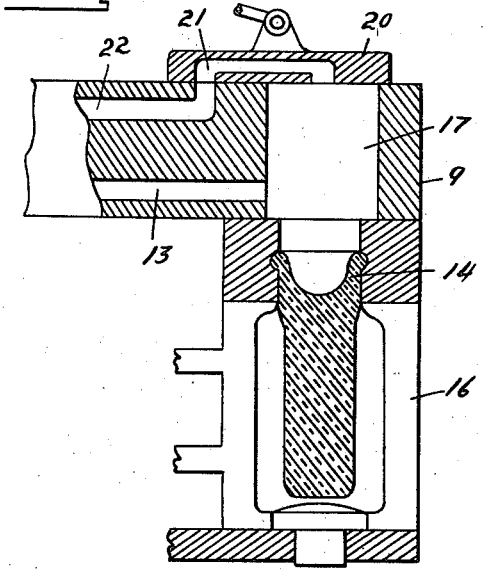
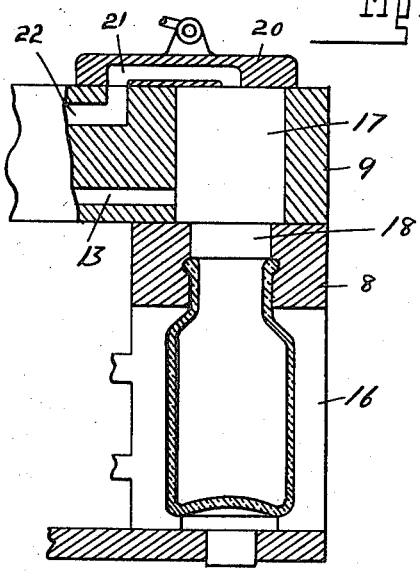
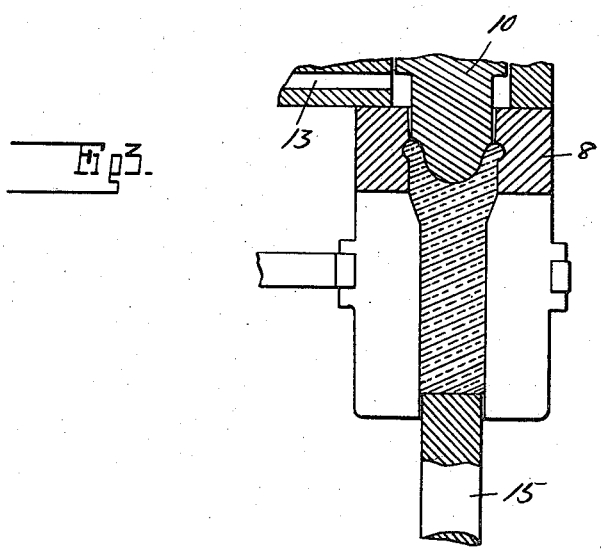

UNITED STATES PATENT OFFICE.

RICHARD LA FRANCE, OF TOLEDO, OHIO, ASSIGNOR TO THE TOLEDO GLASS COMPANY, OF TOLEDO, OHIO, A CORPORATION OF OHIO.

METHOD OF PRODUCING GLASS ARTICLES.

1,231,751.  Specification of Letters Patent.  Patented July 3, 1917.

Application filed April 22, 1912. Serial No. 692,234.

*To all whom it may concern:*

Be it known that I, RICHARD LA FRANCE, a citizen of the United States of America, residing at Toledo, in the county of Lucas and State of Ohio, have invented certain new and useful Improvements in Methods of Producing Glass Articles, of which the following is a specification, reference being had to the accompanying drawings.

My invention consists in a method of producing glass articles, comprising first forming a blank, then associating that blank with a forming mold and then shaping the blank from one end of it, by moving the blank endwise onto a shaping device. The blank may be subsequently shaped for certain articles, as, for instance, bottles or jars, by blowing the blank to form in the usual way.

In the drawings:

Fig. 3 is a section similar to Fig. 2, of a slightly modified form, in which the endwise motion of the blank is produced by a plunger or piston for forcing the blank endwise.

Fig. 4 is a section similar to Fig. 2, showing the blank for a jar suspended in a blowing-mold ready for blowing.

Fig. 5 is a section similar to Fig. 4, showing the article blown.

In carrying out my method for the manufacture of such articles as bottles or jars, I first fill the body-blank mold with glass. This I preferably do by bringing the lower end into juxtaposition with a pool of glass and creating vacuum in the mold cavity, which will fill it with glass as shown in Fig. 1 at 2, and then causing the knife, or cut-off, 3, to pass across the lower end of the mold to sever the string of glass which may be hanging from the glass in the mold.

Figure 1:
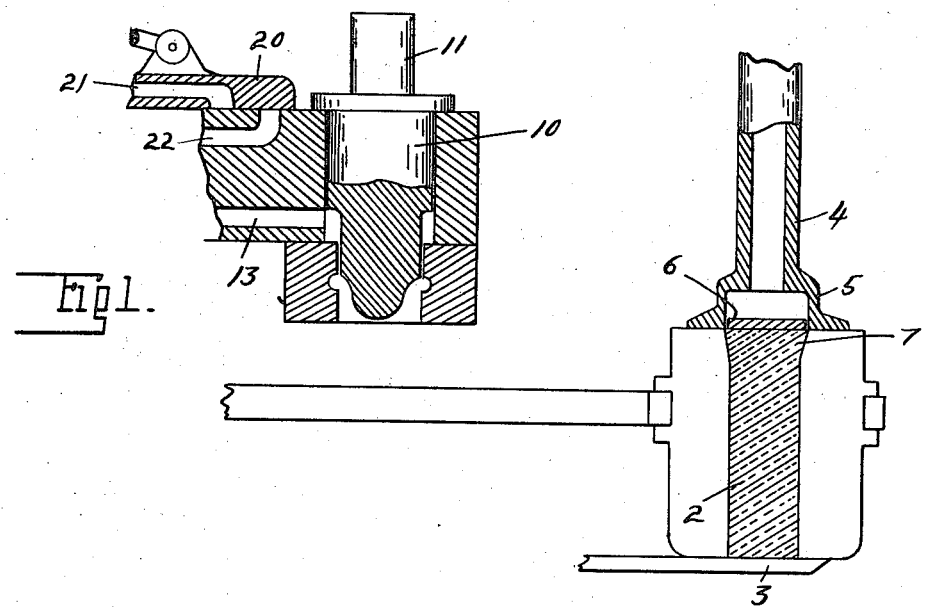
Figure 1 is a section through the body blank mold and the end-shaping mold, such as may be used in carrying out my method. (I have shown this method as employed in the manufacture of bottles, and the shaping-mold in this case may be called the neck-mold, and for convenience in description I will refer to it by that name.)

In Fig. 1 I have shown a pipe 4 with a head 5 fitting on the upper part of the body-blank mold, and marginal apertures 6 leading from the interior of the head into the body-blank mold, with means for exhausting the air during the gathering or filling operation.

I may, and preferably do, make the upper end of the body-blank mold slightly larger than the rest of the blank, as shown at 7, for the purpose of holding it in subsequent operation after the knife is withdrawn.

Figure 2:
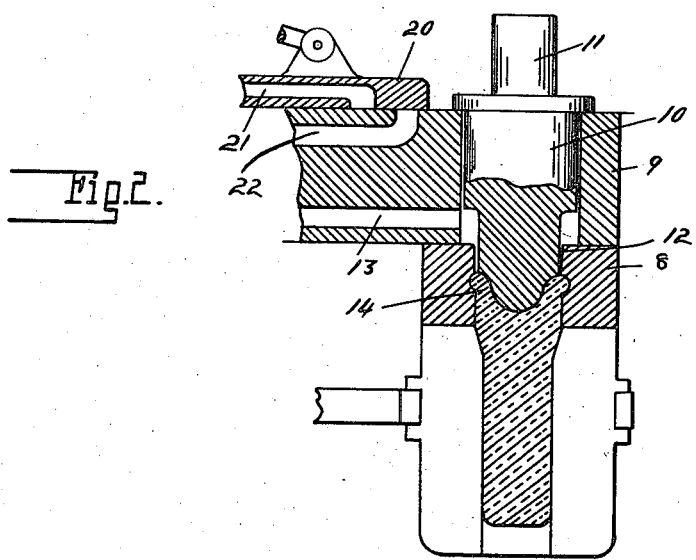
Fig. 2 shows the blank and the neck-mold assembled and means applied for moving the blank endwise for the purpose of shaping the same. In this view the endwise motion of the blank is effected by atmospheric pressure at one end while vacuum is used at the other end.

The pipe and head 4 being withdrawn, the shaping means for the neck-mold is then moved on top of the body-blank mold, as shown in Fig. 2. This shaping means comprises a neck-ring section 8, above which is a tubular head 9 in which is secured a core or plunger 10 movable or actuated by the stem 11. This core or plunger projects into the neck-ring 8 and around the same, or through the same, as desired, are passages 12 communicating with the air-exhaust pipe 13, so that a vacuum may be produced at the upper end of the blank to cause it to be pushed by atmospheric pressure at the other end, endwise in the body-blank mold, up against the core or plunger, shaping the upper of the blank into a tubular neck 14, as plainly shown in Fig. 2.

Instead of producing a vacuum above the blank I may use a plunger 15, entering the lower end of the body-blank mold, to push the blank endwise into the neck-mold and against the core to shape the same.

When the blank has been thus shaped if further operation is desired it may be carried out by blowing in the following manner:

The neck-ring section 8, with the suspended blank, shaped as described is brought into blowing relation with the blowing-mold 16, the core 10 is withdrawn and air is admitted into the chamber 17—which will enter the initial cavity produced by the core or plunger and expand the blank in the blow-mold into the finished article 18, as shown in Fig. 5.

I have shown a sliding block 20 having a passage 21, adapted to be moved so that the end of this passage will connect respectively with the air inlet passage 22 and the chamber 17, so that air under pressure may be passed to any desired section with which the passage 22 is connected into the chamber 17, to blow the article. It will be understood that the mold sections 1, 8 and 16 referred to herein are hinged mold sections, so that they may be opened for the purpose of removing the blank and the finished article. It is also obvious that some articles may be finished without the blowing operation—by simply pushing the blank upon the shaping means after it has been gathered through the blank-mold.

What I claim as my invention is:

The method of making glass articles, consisting in filling a body-blank mold with a quantity of glass, in then engaging a neck mold with the body-blank mold, and in moving the blank endwise within said body-blank mold, and drawing a portion thereof into the neck mold by suction.

In testimony whereof I affix my signature in presence of two witnesses.

RICHARD LA FRANCE.

Witnesses:
T. H. MILLER,
S. E. EICHMAN.